United States Patent
Berube

(10) Patent No.: US 7,595,115 B2
(45) Date of Patent: *Sep. 29, 2009

(54) REPULPABLE CORRUGATED BOXBOARD

(75) Inventor: Serge Berube, Le Gardeur (CA)

(73) Assignee: Le Groupe Recherche I,D. Inc., Granby, Quebec (CA)

( * ) Notice: Subject to any disclaimer, the term of this patent is extended or adjusted under 35 U.S.C. 154(b) by 373 days.

This patent is subject to a terminal disclaimer.

(21) Appl. No.: 11/190,873

(22) Filed: Jul. 28, 2005

(65) Prior Publication Data

US 2005/0266167 A1    Dec. 1, 2005

Related U.S. Application Data

(63) Continuation of application No. 10/351,324, filed on Jan. 27, 2003, now Pat. No. 7,070,865, which is a continuation of application No. 09/662,167, filed on Sep. 14, 2000, now Pat. No. 6,541,556, which is a continuation of application No. 09/032,851, filed on Mar. 2, 1998, now Pat. No. 6,143,113.

(51) Int. Cl.
 B32B 27/10 (2006.01)
 B32B 23/06 (2006.01)
 B32B 29/08 (2006.01)

(52) U.S. Cl. .............. 428/514; 428/511; 428/520; 427/372.2; 524/398; 524/394; 524/406; 524/407; 524/560; 524/577

(58) Field of Classification Search .......... 428/507, 428/510, 514; 524/413, 394
See application file for complete search history.

(56) References Cited

U.S. PATENT DOCUMENTS

| 3,793,067 | A | | 2/1974 | Gallino |
| 3,946,135 | A | | 3/1976 | Peterson |
| 4,117,199 | A | | 9/1978 | Gotoh et al. |
| 4,282,054 | A | * | 8/1981 | Mattor et al. ............ 156/289 |
| 5,285,957 | A | | 2/1994 | Halsell |
| 5,429,294 | A | * | 7/1995 | Propst .................... 229/5.83 |
| 5,562,980 | A | * | 10/1996 | Koutitonsky ............ 428/324 |
| 5,603,996 | A | | 2/1997 | Overcash et al. |
| 5,626,945 | A | | 5/1997 | Berzins et al. |
| 5,654,039 | A | | 8/1997 | Wenzel et al. |
| 5,750,237 | A | * | 5/1998 | Allin et al. .............. 428/182 |
| 5,763,100 | A | | 6/1998 | Quick et al. |
| 6,051,107 | A | | 4/2000 | Varnell |
| 6,416,628 | B1 | * | 7/2002 | Huang et al. ............ 162/180 |

FOREIGN PATENT DOCUMENTS

| GB | 957933 | | 6/1964 |
| WO | WO 95/00596 AL | * | 1/1995 |
| WO | WO 96/22329 | | 7/1996 |

* cited by examiner

Primary Examiner—David Wu
Assistant Examiner—Rip A. Lee
(74) Attorney, Agent, or Firm—Ogilvy Renault LLP

(57) ABSTRACT

A coating composition for the linerboard of corrugated paperboard provides water and grease resistance but is water vapor permeable, and thus permits a different mode of manufacture of corrugated paperboard when aqueous adhesives are employed in the assembly of the linerboards and corrugated medium; in particular the linerboards may be coated with the coating composition prior to assembly of the corrugated paperboard because the water vapor permeable coating permits escape of the water of the aqueous adhesive, during drying of the assembled components of the corrugated paperboard; the coating composition employs a styrene-acrylate copolymer and a $C_{14}$-$C_{18}$ fatty acid complex of a metal ion having an oxidation state of at least 3, such as chromium.

19 Claims, 2 Drawing Sheets

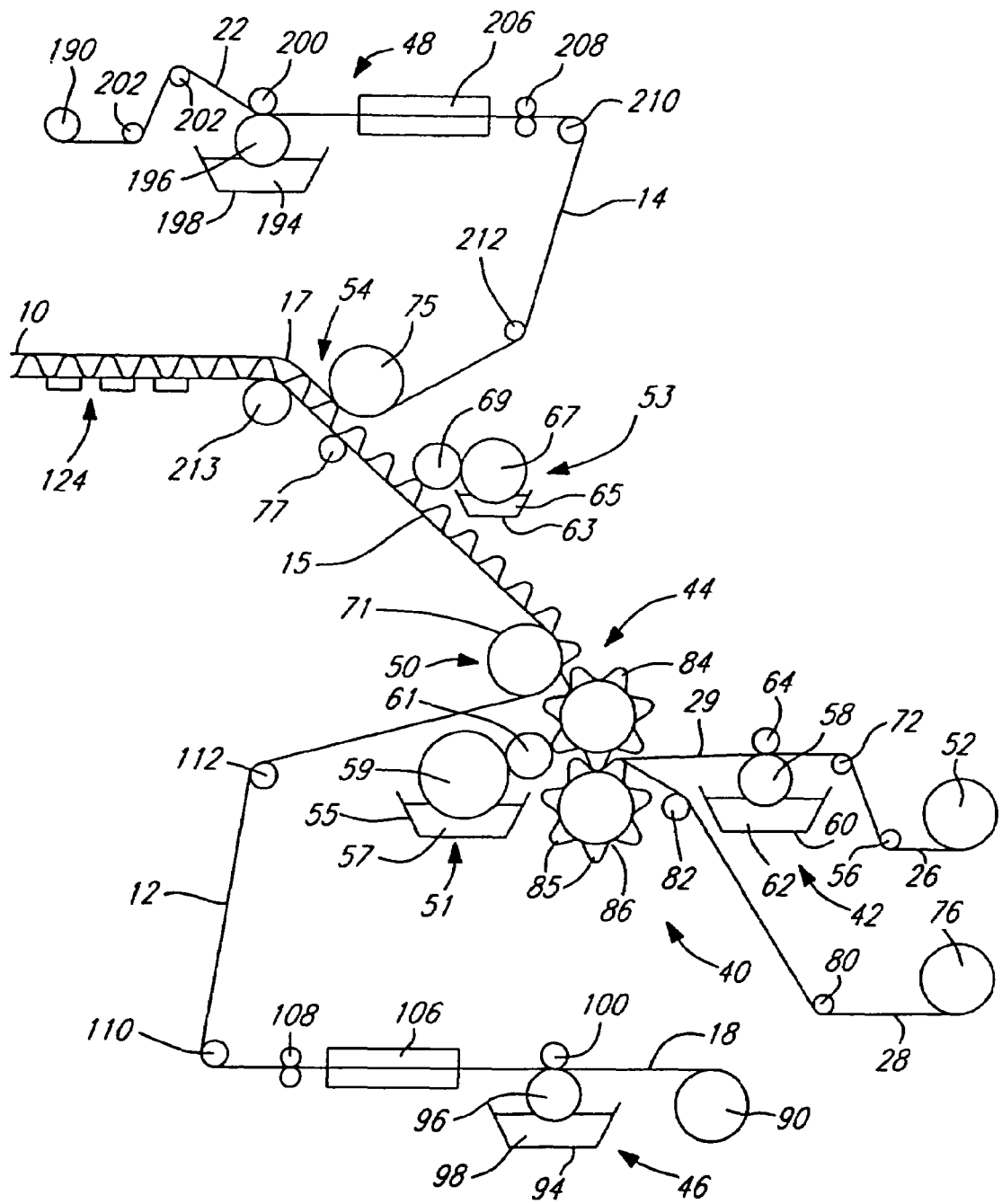

REPULPABLE CORRUGATED BOXBOARD

CROSS-REFERENCE TO RELATED APPLICATIONS

This application is a continuation of U.S. Ser. No. 10/351,324, filed Jan. 27, 2003, now U.S. Pat. No. 7,070,865, issued Jul. 4. 2006, which in turn is a continuation of U.S. Ser. No. 09/662,167, filed Sept. 14, 2000, now U.S. Pat. No. 6,541,556, issued Apr. 1. 2003, which in turn is a continuation of U.S. Ser. No. 09/032,851, filed Mar. 2, 1998, now U.S. Pat. No. 6,143,113, issued Nov. 7, 2000.

BACKGROUND OF THE INVENTION i) Field of the Invention

This invention relates to a composition for forming a repulpable, water resistant, grease resistant, water vapor permeable coating on a porous paper sheet material; a repulpable coated paperboard liner for use in corrugated paperboard packaging manufacture, a method of producing a repulpable coated paperboard liner; a repulpable corrugated paperboard and a method of producing a repulpable corrugated paperboard.

ii) Description of Prior Art

Perishable food products such as frozen meat, fish and vegetables are shipped, stored and displayed for sale in packages formed of corrugated paperboard coated with a water resistant or repellant material, the most widely used coating being a wax coating. The wax coating renders the packages resistant or repellant to water and impermeable to water vapor.

Such packages, however, have a serious disadvantage in that they are essentially non-repulpable. Repulping refers to the art of recycling waste paper products including paperboard to provide a reusable wood pulp. Recyclability of waste paper products is of growing importance in efficiently employing available wood fibre resources and in curtailing the amount of waste which is either combusted or disposed of in landfill sites.

The problem in recycling wax-coated paperboard is well established and is described in, for example, U.S. Pat. Nos. 5,626,945 and 5,562,980 and PCT International Publication WO 96/22329.

An additional problem or manufacturing limitation with existing water repellent coatings, such as wax coatings, for corrugated paperboard packaging, is that the wax coating can only be applied to the finished or assembled corrugated paperboard.

Corrugated paperboard comprises an assembly of a pair of spaced apart linerboards with a corrugated medium sandwiched therebetween and adhered thereto. In particular, the tips of the flutes of the corrugated medium are adhered by an adhesive to the inwardly facing surfaces of the linerboards. The most widely used adhesives are aqueous starch-based adhesives which meet Government standards, e.g., FDA standards, for food packages. After assembly the adhesive is dried liberating water vapor which escapes through the porous uncoated linerboards.

If the wax coating were to be applied to the linerboards prior to assembly of the corrugated paperboard, the vapor impermeable wax coating would prevent the escape of the water vapor from the adhesive and the water vapor would be trapped and condense in the interior of the corrugated paperboard.

Consequently employing conventional water vapor impermeable coatings such as the wax coatings, necessitates complete assembly and formation of the corrugated paperboard before application of the vapor impermeable coating. This places significant restrictions on the manufacturing process.

SUMMARY OF THE INVENTION

It is an object of this invention to provide a composition for forming a water-resistant, grease resistant, water vapor permeable coating on a porous paper sheet material.

It is a further object of this invention to provide such a composition having the quality that the thus coated porous paper sheet material is repulpable.

It is a further object of this invention to provide such a composition which forms such a coating which is also heat resistant.

It is still another object of this invention to provide a repulpable coated paper substrate for packaging, especially a coated paperboard liner for use in corrugated paperboard packaging manufacture.

It is yet another object of this invention to provide a method of producing the afore-mentioned repulpable coated paper substrate for packaging, especially a coated paperboard liner.

It is a further object of this invention to provide a repulpable corrugated paperboard.

It is a still further object of this invention to provide a method of producing the afore-mentioned repulpable corrugated paperboard.

In accordance with one aspect of the invention there is provided a composition for forming a water resistant, grease resistant, water vapor permeable coating on a porous paper sheet material, comprising: i) a styrene-acrylate copolymer; ii) a $C_{14}$-$C_{18}$ fatty acid complex of a metal ion having an oxidation state of at least 3, and iii) an aqueous vehicle.

In accordance with another aspect of the invention there is provided a repulpable coated paperboard liner for use in corrugated paperboard packaging manufacture comprising: a) a paperboard sheet having opposed first and second surfaces, b) a water resistant, grease resistant, water vapor permeable coating on at least one of said surfaces, said coating comprising a styrene-acrylate copolymer and a $C_{14}$-$C_{18}$ fatty acid complex of a metal ion having an oxidation state of at least 3.

In accordance with still another aspect of the invention there is provided a method of producing a repulpable coated paperboard liner for use in corrugated paperboard packaging manufacture comprising: a) providing a paperboard sheet having opposed first and second surfaces, b) coating at least one of said surfaces with a composition comprising: i) styrene-acrylate copolymer, ii) a $C_{14}$-$C_{18}$ fatty acid complex of a metal ion having an oxidation state of at least 3, and iii) an aqueous vehicle, and c) drying said composition to form a repulpable, water resistant, grease resistant, water vapor permeable coated linerboard.

In accordance with yet another aspect of the invention there is provided a repulpable corrugated paperboard comprising: a) first and second coated paperboard liners and a corrugated medium therebetween, each of said liners having opposed inner and outer surfaces, and said corrugated medium being adhesively secured to said inner surfaces, b) at least one of said outer surfaces having a water resistant, grease resistant, water vapor permeable coating thereon, and c) said corrugated medium being water vapor impermeable.

In accordance with a further aspect of the invention there is provided a method of producing a repulpable corrugated paperboard comprising: a) providing paperboard sheet having opposed first and second surfaces, b) coating at least one of said surfaces with a coating composition which dries to form a water resistant, grease resistant, water vapor permeable coating, c) drying said composition to form a repulpable, water resistant, grease resistant, water vapor permeable coated paperboard liner, d) adhesively securing a water vapor impermeable corrugating medium between a pair of paperboard liners, at least one of said liners being a said coated paperboard liner, with a water-based adhesive, and e) curing said adhesive, allowing water vapor of said water-based adhesive to escape through said at least one liner.

DETAILED DESCRIPTION OF THE INVENTION i) Descriptions

Certain terms are employed herein to identify characteristics of the coating composition, the coated paperboard liner and the corrugated paperboard. These terms are believed to be clear in the context of the invention, to a person skilled in the art but are further elaborated here.

The terms "water repellent" and "water resistant" refer to the tendency of the coating to repel, block or, in any event, not transmit or absorb any significant quantity of liquid water in normal use. In other words, these terms identify a liquid water-blocking property of the coating sufficient for packing intended for perishable frozen foods.

The term "grease resistant" refers to the character of the coating in repelling, blocking or, in any event, not transmitting or absorbing any significant quantity of grease or oil.

The term "water vapor permeable" refers to the character of the coating in permitting passage therethrough of water in vapor form.

The term "water vapor impermeable" refers to the character of the corrugating medium in not permitting passage therethrough of water in vapor form.

The term "repulpable" refers to the character of the coated paperboard liner and the corrugated paperboard, whereby the paper fibre component of the paperboard liner and the corrugated paperboard can be readily recovered as a pulp suitable for use in paper product manufacture, the coating composition of the invention not presenting any significant obstacle to such pulp recovery. The term is to be viewed in the context that the conventional wax coated paperboard liners employed in corrugated paperboard packages for perishable frozen foods, are considered essentially non-repulpable based on a number of factors including the difficulty in separating the wax coated paper fibres and the contamination of any fibre pulp produced with wax particles which form stickies rendering the pulp unsuitable for paper manufacture.

As such the term "repulpable" contemplates absence or substantial absence of wax or comparable materials which would render the paperboard liner and corrugated paperboard non-repulpable.

The term "heat resistant" refers to the character of the coating in not becoming soft or tacky at the manufacturing temperatures encountered in the manufacture of corrugated paperboard, more especially at temperatures below about 200° C.

In the present invention the corrugated paperboard has the necessary characteristics for packaging of perishable frozen foods, including water-repellency, grease resistance and water vapor impermeability. The water repellency and grease resistance, but not the water vapor impermeability, are provided by the coated paperboard liners; the water vapor impermeability is provided by the corrugating medium.

The employment of the coating composition of the invention which provides a coating for the porous paperboard liners, which is water vapor permeable, permits considerable variation in the manufacture of the corrugated paperboard.

Thus the corrugated paperboard may be assembled employing pre-coated paperboard liners which are water vapor permeable so that post-coating of the manufactured corrugated paperboard is not required, thereby considerably simplifying the manufacturing process of the corrugated paperboard.

ii) Coating Composition

The coating composition of the invention forms a water resistant, grease resistant, water vapor permeable coating on a porous paper sheet material, such as paper linerboard employed in the manufacture of corrugated paperboard.

The coating composition has particular application for the coating of the paper linerboard of corrugated paperboard employed in packaging in which the paperboard is required to be water resistant or repellent and grease resistant, such as in packaging for perishable frozen foods.

a) Copolymer

The coating composition comprises a styrene-acrylate copolymer and a $C_{14}$-$C_{18}$ fatty acid complex of a metal ion having an oxidation state of at least 3, in an aqueous vehicle.

The copolymer is, in particular, a copolymer of styrene and an alkyl acrylate in which the alkyl moiety has 1 to 6 carbon atoms. Butyl acrylate is especially preferred as the comonomer of styrene.

One particular commercially available source of the copolymer is the styrene/butyl acrylate copolymer dispersion available under the Trade-mark ACRONAL 296 D from BASF and which is described as a dispersion in water having a content of the copolymer of about 50%, (50%±1), a pH of 7.5 to 9, a viscosity at 23° C. (ISO 3219) of 300 to 650 mPas, and an apparent Brookfield viscosity at 23° C. of about 10,000 mPas.

The dispersion is further described as being anionic, having a density of about 1.04 $g/cm^3$, and having an average particle size of particles of the copolymer of about 0.1 μm.

The dispersions of the styrene-acrylic copolymer may typically contain 40 to 60%, preferably about 50%, by weight of the copolymer.

b) Complex

The complex of the metal ion is in particular a complex of a metal having an oxidation state of at least 3, for example, an ion of iron, titanium, chromium or vanadium. The $C_{14}$-$C_{18}$ fatty acid of the complex may be, for example, tetradecanoic acid also known as myristic acid; or octadecanoic acid also known as stearic acid. The complex may comprise a mixture of $C_{14}$-$C_{18}$ fatty acids.

A commercially available class of complexes suitable in the invention is that available under the Trade-mark QUILON of DuPont Company which class comprises solutions of a chemically reactive complex in which a $C_{14}$-$C_{18}$ fatty acid is coordinated with trivalent chromium. The vehicle of the solutions is primarily an alkanol, usually isopropanol.

Particular complexes include chromium pentahydroxy(tetradecanoato)di- available in solution under the Trade-marks QUILON C and C-9 and which are catalogued by CAS Registry No. 65229-24-5; tetradecanoato chromic chloride hydroxide available in solution under the Trade-mark QUILON M and catalogued by CAS Registry No. 15659-56-0; and octadecanoato chromic chloride hydroxide available under the Trade-mark QUILON S and catalogued by CAS Registry No. 15242-96-3.

These complexes are considered to have a structure of the following form in which R is a fatty acid radical of 13 to 17 carbon atoms and R' is the alkyl group of the alkanol vehicle, for example, isopropanol.

When the alcoholic solution of the complex is diluted with water, aquo groups replace the coordinated alcohol groups and some of the chlorine atoms. The chlorine atoms enter solution as chloride ions and the complex acquires a positive charge; the complexes may polymerize through hydroxyl bridges, as a result of hydrolysis or neutralization.

The different grades of QUILON are described by DuPont Company as having the following typical properties set forth in Table I In general, the coating composition may contain in weight % to a total of 100%:

| | |
|---|---|
| Aqueous dispersion of styrene-acrylate copolymer | 35 to 99.5% |
| Alcoholic solution of complex | 0.5 to 5% |
| Particulate filler | 0 to 35% |
| Additional water | 0 to 25%. |

TABLE I

QUILON chromium complexes

| | | C | C-9 | H | L | L-11 | M | S |
|---|---|---|---|---|---|---|---|---|
| Appearance | | blue-green liquid | blue-green liquid | dark-green liquid | dark-green liquid | blue-green liquid | dark-green liquid | dark-green liquid |
| Odor | | alcoholic | alcoholic | alcoholic | alcoholic | alcoholic | alcoholic | alcoholic |
| Chromium as Cr. wt. % | | 5.7 | 9.2 | 9.2 | 9.2 | 11.0 | 5.7 | 5.7 |
| Chloride as Cl, wt. % | | 7.8 | 12.7 | 12.6 | 12.7 | 15.2 | 7.8 | 7.8 |
| Fatty Acid ($C_{14}$-$C_{18}$) wt. % | | 11.8 | 21.2 | 19.0 | 21.2 | 25.2 | 11.7 | 14.8 |
| Boiling point, approx. | °C. | 82 | — | 82 | 82 | — | 82 | 82 |
| | °F. | 180 | — | 180 | 180 | — | 180 | 180 |
| Freezing Point, | °C. | −47 | — | 2 | 4 | — | −50 | −35 |
| | °F. | −53 | — | 36 | 39 | — | −58 | −31 |
| Flash Point (TOC) | °C. | 4 | — | −3 | −2 | — | 1 | 2 |
| | °F. | 39 | — | 27 | 29 | — | 34 | 36 |
| Density at 20° C.(68° F.) | g/ml (Mg/-$m^3$) | 0.953 | 1.050 | 1.015 | 1.025 | 1.125 | 0.922 | 0.924 |
| | lb/gal | 8.1 | 8.7 | 8.7 | 8.6 | 9.3 | 7.8 | 7.9 |
| Solubility in Water | | Complete indefinite | Complete negligible sludging | Complete indefinite | Complete indefinite | Complete indefinite | Complete indefinite | Complete may sludge after 5 months |
| Comodity stability at storage temps. below 32° C.(90° F.) and above freezing point | | | | | | | | |

Especially good results were achieved with QUILON C which also provides coating compositions displaying good storage stability.

The complex of the invention is more especially a so-called Werner complex.

The alcoholic solution of the complex may suitably contain about 3 to about 15%, preferably about 4 to about 12%, more preferably about 5 to about 10%, by weight of the metal ion, especially chromium and about 8 to about 28%, preferably about 10 to about 25%, by weight of fatty acid; and may typically contain chloride in an amount of about 5 to about 20%, preferably about 7 to about 15%, by weight.

c) Other Components

The aqueous vehicle of the coating composition comprises the water of the aqueous dispersion of the copolymer and the alkanol of the solution of the complex.

The coating composition may additionally comprise an inert particulate filler, for example, clay and may contain water in addition to that derived from the aqueous dispersion of the copolymer, which in this Specification is referred to as "additional water". The additional water is employed to lower the viscosity, if desired.

Amounts of the alcoholic solution above 5% result in loss of stability and shorten the shelf life of the coating composition.

The particulate filler which is suitably a clay filler such as that available under the Trade-mark Omnifil provides heat resistance in the coating.

Such heat resistance is advantageous to the extent that heat is employed in the manufacture of the corrugated paperboard, for example, in the adhesion of the coated liner board to the corrugated medium, where the coating on the coated linerboard may be in direct contact with a heated pressure roll or platens which pressure roll or platens may typically be at a temperature of about 177° C.

Preferably the filler is present in an amount of 10 to 15%, by weight. Amounts of the filler above 35%, by weight, result in deterioration in the water and grease resistance.

The coating composition applied to porous paper sheet material, such as linerboard for use in corrugated paperboard manufacture, forms a water resistant, grease resistant coating which is permeable to water vapor, and the coated paper sheet material is pulpable, the coating separating readily from the paper sheet material during repulping.

The coating composition is applied in a dry coating weight of 5 g/m² to 25 g/m². Typically the lower coating weights will be employed for smooth surface paper substrates and higher coating weights for more porous surface paper substrates.

It will be understood that the coating composition of the invention is a wax-free composition, although small amounts of wax might be tolerated to the extent that the coated linerboard still retains its repulpability and the coating is water vapor permeable.

iii) Water Impermeable Coating

The coating composition of the invention is particularly employed for coating linerboard for use in corrugated paperboard manufacture.

In such case the corrugated medium of the invention is coated to produce a water vapor impermeable barrier to provide the required water vapor impermeability in the corrugated paperboard.

The coating employed should be one which renders the corrugated medium repulpable so that the repulpable coated corrugated medium in conjunction with the repulpable coated linerboard is repulpable.

The coating providing water-vapor impermeability may be, for example, the coating described in WO 96/22329, published Jul. 25, 1996, S. Berube, the teachings of which are incorporated herein by reference. In general the afore-mentioned publication describes a moisture vapor barrier coating for a paper substrate, which produces a repulpable coated paper substrate, the moisture vapor barrier coating is more especially based on polyvinylidene chloride, although other polymer materials are also described. The polymer is employed in emulsion from and may additionally contain an additive such as hydrated aluminum silicate, calcium carbonate or vinyl acetate homopolymer.

Another preferred moisture vapor barrier containing composition for forming the water-vapor impermeable coating comprises a combination of polyvinylidene chloride, styrene-butadiene copolymer and an acrylic polymer. This composition is employed as a dispersion of the three polymers in an aqueous vehicle and may be applied between a pair of paper substrates which are then laminated together, the composition forming a water-vapor impermeable coating or layer therebetween. This laminate is then corrugated to form the corrugated medium.

Alternatively the composition may be applied to one or both sides of a paper substrate to form a coated substrate which is then corrugated to form the corrugated medium. It is also possible to apply the composition as a coating to a preformed corrugated medium.

The water impermeable coating is wax-free, although small amounts of wax might be tolerated to the extent that the resulting water impermeable corrugated medium retains its repulpability.

BRIEF DESCRIPTION OF DRAWINGS

FIG. 2 illustrates schematically the production of linerboard in accordance with the invention and assembly of corrugated paperboard.

DESCRIPTION OF PREFERRED EMBODIMENTS WITH REFERENCE TO THE DRAWINGS

Figure 1:
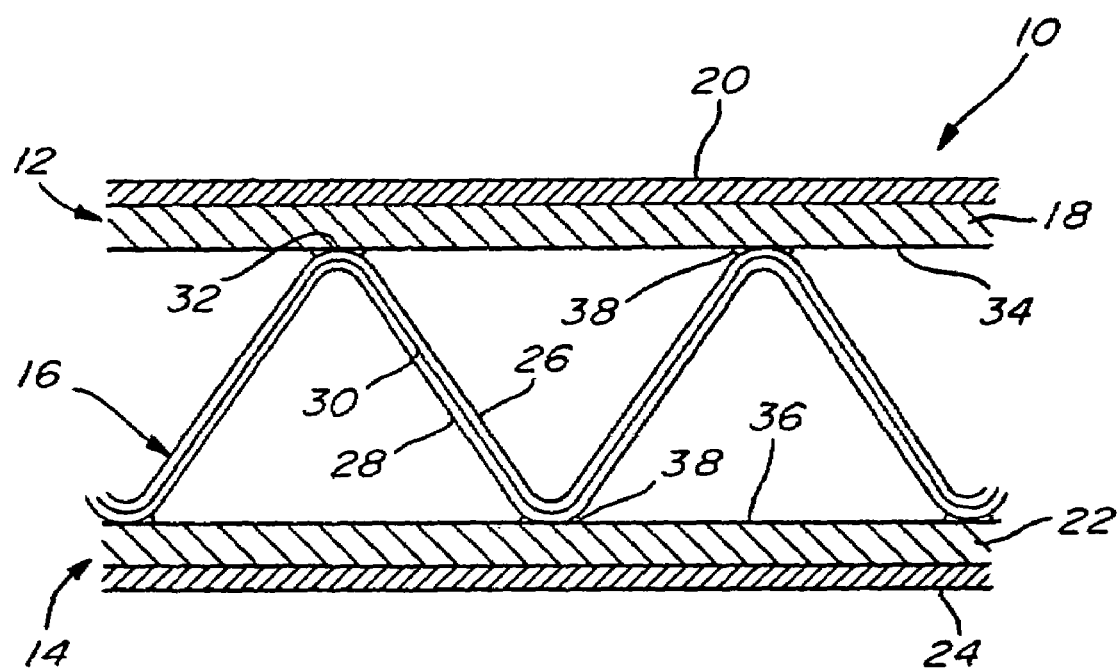
FIG. 1 is a schematic representation in cross-section of corrugated paperboard of the invention.

With further reference to FIG. 1, a corrugated paperboard 10 of the invention comprises coated linerboard 12 and coated linerboard 14 with laminated corrugated medium 16 therebetween.

Coated linerboard 12 comprises linerboard 18 having a coating 20 thereon. Coating 20 is water-resistant, grease resistant and water vapor permeable.

Coated linerboard 14 comprises linerboard 22 and coating 24 of the same character as coating 20.

Laminated corrugated medium 16 comprises paper layers 26 and 28 with a vapor barrier 30 therebetween. Vapor barrier 30 is water vapor impermeable.

The flute tips 32 of laminated corrugated medium 16, are adhered to the inner faces 34 and 36 of linerboards 18 and 22 respectively by adhesive 38 which, in particular, is derived from an aqueous starch-based adhesive composition.

The vapor barrier 30 renders the corrugated paperboard 10 water vapor impermeable and the coatings 20 and 24 render the corrugated paperboard water resistant and grease resistant. Coatings 20 and 24 separate readily from linerboards 18 and 22 respectively during repulping to enter solution or form fine fragments that are readily separated from the pulp fibers of the linerboard. Similarly, vapor barrier 30 readily separates from the paper layers 26 and 28 of corrugated medium 16 during repulping to form fragments which are readily separated from the pulp fiber of the paper layers 26 and 28. In this way the corrugated paperboard 10 is repulpable.

With further reference to FIG. 2, there is shown schematically corrugated paperboard apparatus 40 including corrugating coater assembly 42, corrugator 44, liner coating assembly 46, liner coating assembly 48 and board fabricators 50 and 54.

Paper sheet 26 is fed from supply roll 52 to corrugating coater assembly 42. The corrugating coater assembly 42 includes rolls 56 and 72, a coating roll 58 mounted for rotation in a coating bath 60 containing coating composition 62 to form a vapor barrier 30.

In FIG. 2 there is further shown a second supply roll 76 of paper sheet 28 and roll 80. There could, in addition, be included a second full corrugating coating assembly 42 to provide a coating of vapor barrier 30 to paper sheet 28.

Corrugator 44 includes corrugating rolls 84 and 86 both of which have corrugating teeth 85, and feed roll 82.

Liner coating assembly 46 includes a coating bath 94 and a coating roll 96. Coating bath 94 contains coating composition 98 and coating roll 96 is mounted for rotation so that a lower portion thereof rotates through coating composition 98.

Liner coating assembly 46 further includes rolls 100, 110 and 112, a pair of guide rolls 108 and drying unit 106.

A supply roll 90 feeds linerboard 18 to the nip between roll 100 and coating roll 96.

Liner coating assembly 48 is of the same form as liner coating assembly 46 and the same parts are shown with the same integers raised by 100 so that no further description of liner coating assembly 48 is required. However, assembly 48 additionally includes guide rolls 202 in the feed from supply roll 190 to coating bath 194.

Board fabricators 50 and 54 include adhesive applicators 51 and 53, respectively.

Applicator 51 includes a bath 55 of an aqueous starch adhesive 57 and applicator rolls 59, 61. Applicator 53 includes a bath 63 of the aqueous starch adhesive 65 and applicator rolls 67, 69.

Fabricator 50 further includes pressure roll 71 which engages corrugating roll 84 of corrugattor 44; and fabricator 54 includes contact roll 75 and rider roll 77.

Apparatus 40 further includes heater platens 124, and feed roll 213.

The apparatus 40 in FIG. 2 may be employed to produce the corrugated paperboard 10 in FIG. 1.

In operation of the apparatus 40, paper sheet 26 is fed from supply roll 52 over rolls 56 and 72 and between a nip formed between coating roll 58 and roll 64. Coating roll 58 rotates through coating composition 62 in bath 60 and picks up coating composition 62 which is applied to paper sheet 26 as it passes between coating roll 58 and roll 64 to provide a wet coating of vapor barrier 30. The thus wet coated sheet 29 is fed to corrugator 44.

A separate paper sheet 28 is fed from supply roll 76 over roll 80 and feed roll 82 to corrugator 44. In corrugator 44 wet coated sheet 29 and sheet 28 are laminated together with the vapor barrier 30 formed from coating composition 62 therebetween.

In corrugator 44 the coated sheet 29 and sheet 28 pass between the rotating corrugating rolls 84 and 86 where they are engaged by the teeth 85, under pressure and at a temperature of 175° C. to 195° C. to form the corrugated medium 16 (see FIG. 1).

At adhesive applicator assembly 50 an aqueous starch-based adhesive 57 is applied to the tips 32 (see FIG. 1) of the flutes on one side of corrugating medium 16.

This adhesive 57 is applied from roll 61 which picks up adhesive 57 from roll 59 a lower portion of which rotates through the bath 55 of adhesive 57. The adhesive coated tips 32 are pressed into engagement with the uncoated face of coated linerboard 12, the production of which is described below, between the pressure roll 71 and corrugating roll 84 to form a partial board 15. The pressure roll 71 and the corrugating roll 84 are suitably both at a temperature of 150 to 190° C., preferably about 177° C., pressure roll 71 being in direct contact with coated linerboard 12.

The partial board 15 is fed to fabricator 54 where adhesive 65 is applied to the tips 32 (see FIG. 1) of flutes on the remaining, exposed side of corrugating medium 16, in the same way as at fabricator 50, and the adhesive coated tips 32 are pressed into engagement with the uncoated face of coated linerboard 14, the production of which is described below, between the contact roll 75 and rider roll 77 to form precursor 17 of corrugated paperboard 10.

At liner coating assembly 46, linerboard 18 is fed from a supply roll 90 to the nip between coating roll 96 and roll 100. Coating roll 96 rotates through the coating composition 98 in coating bath 94 and picks up coating composition which is applied to linerboard 18 at the afore-mentioned nip between rolls 96 and 100. The thus coated linerboard 18 is fed through drying unit 106 where the coating composition is dried to form coated linerboard 12. In the same manner, coated linerboard 14 is formed from linerboard 22 in liner coating assembly 48.

Coated linerboard 12 is guided from drying unit 106 by guide rolls 108 and feed rolls 110 and 112 to board fabricator 50. Coated linerboard 14 is fed in similar fashion to board fabricator 54.

In precursor 17 the corrugated medium 16 is sandwiched between coated linerboards 12 and 14 and is adhered to the inner non-coated faces thereof by the aqueous starch-based adhesive. Precursor 17 is fed over roll 213 to heated platens 124 where water in the aqueous starch-based adhesive is vaporized and escapes from the percursor 17 through the coated linerboards 12 and 14 which comprise the porous linerboards 18 and 22 respectively and the vapor permeable coatings 20 and 24 thereon derived from coating compositions 98 and 198 respectively.

While FIG. 2 shows apparatus 40, composed of the different elements aligned and arranged for continuous manufacture of the corrugated paperboard, it will be understood that the operations illustrated could, in part, be carried out independently and at different sites. Thus the coated linerboards 12 and 14 could be produced at one site and the corrugated medium 16 could be produced at the same or a different site, whereafter the coated linerboards 12 and 14 and corrugated medium 16 could be shipped to yet another site for application of the adhesive to the corrugated medium 16 and fabrication of the corrugated paperboard 10 from the coated linerboards 12 and 14 and the corrugated medium 16 with the applied adhesive.

Thus in contrast to prior procedures the coatings on the linerboard which provide water resistance and grease resistance are applied to the linerboard prior to assembly of the linerboard with the corrugating medium to form the corrugated paperboard, and this facilitates fabrication of the different components of the corrugated board at different sites by different specialists. The corrugated paperboard is completed at the site of the board fabricator and the board fabricator does not need to apply coatings to the corrugated paperboard to provide the water and grease resistance.

It will be understood that arrangements other than that illustrated in FIG. 2 are within the scope of the invention. Thus, as already indicated above, paper sheet 28 may likewise be coated with coating composition 62. Similarly, while as illustrated only the faces of linerboards 18 and 22 which form the outer faces of the final corrugated paperboard 10, are coated with coating compositions 18 and 22, it is within the scope of the invention to coat both faces of linerboards 92 and 192 with the coating compositions to further enhance the water resistance and grease resistance.

The heated platens 124 conveniently operate at a temperature of about 150 to 180° C. to drive off the water of the aqueous starch-based adhesive.

The drying units 106 and 206 conveniently operate at temperatures of about 100 to 200° C.

EXAMPLES

Example 1

A coating composition for linerboard was produced by adding 57.3 kg of ACRONAL 296 D, an aqueous dispersion available from BASF, of a styrene-butyl acrylate copolymer to a tank. A premix was formed of 1.15 kg of QUILON C, described previously, and 34.38 kg of water (additional water), and the premix was added slowly to the aqueous dispersion of the copolymer in the tank, with agitation. A clay filler available under the Trade-mark OMNIFIL was added to the tank under agitation. The resulting liquid coating composition had a pH of 5 to 7 and a viscosity (Brookfield RVT Spindle #2 at 20 rpm) of 50 to 200 cps.

The coating composition was coated on paper linerboard by a conventional coater at a dry coating weight of 10 g/m$^2$.

Example 2

The procedure of Example 1 was followed but employing the following components only:

|  |  |
| --- | --- |
| ACRONAL 296 D | 95 kg |
| QUILON C | 1.5 kg |
| Water (additional water) | 3.5 kg. |

The resulting coating composition had a pH of 5 to 7 and a viscosity (Spindle #2 at 20 rpm) to 200 to 500 cps.

The composition was coated on paperboard liner by a conventional coater at a dry coating weight of 15 g/m$^2$.

Example 3

A repulpable corrugated medium was produced employing a vapor barrier composition containing the following in wt. %:

|  |  |
| --- | --- |
| Dispersion of PVDC | 83.5% |
| SBR 65 | 14.8% |
| STEROCOLL FD | 0.5% |
| Ammonia | 0.2%. |

The PVDC (polyvinylidene chloride) dispersion was a commercially available dispersion, marketed under the Trade-mark SERFENE 2022; SBR is a styrene-butadiene copolymer available from BASF and STEROCOLL FD (Trade-mark of BASF for an acrylic acid polymer).

The composition was applied to a paper substrate precursor of the corrugated medium by a conventional coater or laminator at a dry coating weight of 15 g/m$^2$, and the resulting coated substrate was laminated to an uncoated paper substrate between corrugating rolls at about 175° C.

The flute tips of the resulting corrugated medium were coated with an aqueous starch-based adhesive in conventional manner and the coated linerboard of Example 1 was adhered, under pressure, to opposed sides of the corrugated medium at the flute tips. The resulting corrugated paperboard assembly was dried on heated platens at about 150° C. and water vapor could be observed escaping from the corrugated paperboard.

Example 4

Following the procedure of Example 1 two coating compositions A and B for linerboard were produced and Domtar #26 paper linerboard was coated with different coating rods to produce different coating thicknesses.

The characteristics of the resulting coated linerboards was measured. The cobb test T441 is an evaluation of water resistance and the turpentine test T454 is an evaluation of grease or oil resistance.

The characteristics and formulae are set out below in Tables II, III, IV and V.

TABLE II

| Coating Composition A Characteristics | | | | |
| --- | --- | --- | --- | --- |
| film properties | rod 10 | rod 15 | rod 20 | rod 25 |
| coating weight g/m$^2$ | 8.5 | 13.0 | 17.0 | 21.0 |
| cobb test T441 30 min | 10 g/m$^2$ | 10 g/m$^2$ | 0 g/m$^2$ | 0 g/m$^2$ |
| cobb test T441 60 min | — | 10 g/m$^2$ | 10 g/m$^2$ | 10 g/m$^2$ |

TABLE II-continued

| Coating Composition A Characteristics | | | | |
| --- | --- | --- | --- | --- |
| film properties | rod 10 | rod 15 | rod 20 | rod 25 |
| turpentine test T454 | 30 minutes | >3 days | >3 days | >3 days |
| cobb test T441 30 min creased | — | — | 0 g/m$^2$ | 0 g/m$^2$ |
| turpentine test T454 creased | — | — | 1 day | — |
| heat resistance (maximum temperature) 10 psi, 120 sec. | — | on metal: 200° C. on liner: 190° C. | on metal: 200° C. on liner: 190° C. | — |
| repulpability | — | <=1/16" | <=1/16" | <=1/162" |

TABLE III

| Coating Composition A | |
| --- | --- |
| Ingredient | % by weight |
| Acronal 296D (BASF) | 53.48 |
| Quilon C (Dupont de Neymour) | 1.07 |
| Omnifil (L. V. Lomas) | 13.37 |
| Water | 32.08 |

TABLE IV

| Coating Composition B | |
| --- | --- |
| Ingredient | % by weight |
| Acronal 296D (BASF) | 57.31 |
| Quilon C (Dupont de Neymour) | 1.15 |
| Omnifil (L. V. Lomas) | 7.16 |
| Water | 34.38 |

TABLE V

| Comparison of Coating Composition | | |
| --- | --- | --- |
|  | A | B |
| Solids Content % wt | 36.1% | 33.7% |
| pH | 6.2 | 6.2 |
| Viscosity cps | 100 | 100 |
| Density | 1.16 g/cm$^3$ | 1.14 g/cm$^3$ |

The coated linerboard displayed good transmission of water vapor employing the a PERMATRAN-WIA water vapor transmission rate testing instrument from Mocon of Minneapolis.

Example 5

The procedure of Example 4 for composition B was repeated with fresh materials but employing only a #25 rod for a coating weight of 17 g/m$^2$ dry, the coated linerboard was dried at 200° C. for 1 minute. In the Cobb test and the turpentine test the coated surface of the coated linerboard of one sample was first heated at 190° C. for 60 seconds at 10 psi. The results showed no difference in the Cobb test and the turpentine test between the heated and unheated sample. The results are shown in Table VI below:

TABLE VI

| film properties | results |
| --- | --- |
| Cobb test T441, 60 minutes unheated sample | 0 g/m² |
| Cobb test T441, 60 minutes coated side heated at 190° C., 10 psi for 60 sec. | 0 g/m² |
| turpentine test T454 unheated sample | >3 days |
| turpentine test T454 coating side heated at 190° C. 10 psi for 60 sec. | >3 days |
| heat resistance maximum dwell time 190° C., 10 psi, one hot plate | on liner: 120 seconds on metal >300 seconds |
| heat resistance maximum dwell time 190° C., 10 psi, two hot plates | on liner: 60 seconds on metal >300 seconds |
| repulpability | excellent |

The test results showed that the fresh composition B performed as well as previously, in Example 4. Moreover, the coated surface properties are not affected by heat. The coating composition produces a coating which is highly flexible and heat resistant and the coated linerboard is repulpable.

I claim:

1. A repulpable corrugated paperboard comprising:
    a) first and second coated paperboard liners and a corrugated medium therebetween, each of said liners having opposed inner and outer surfaces, and said corrugated medium being adhesively secured to said inner surfaces with a cured adhesive derived by curing a water-based adhesive,
    b) at least one of said outer surfaces having a wax-free water-resistant, grease-resistant, water vapor permeable coating thereon, said water vapor permeable coating causing said liner having said coating to have a water vapor permeability that is high enough to permit said adhesive to dry by allowing water vapor of said water-based adhesive to escape, and
    c) said corrugated medium being water vapor impermeable.

2. A repulpable corrugated paperboard according to claim 1, wherein said coating comprises a styrene-acrylate copolymer and a $C_{14}$-$C_{18}$ fatty acid complex of a metal ion having an oxidation state of at least 3.

3. A repulpable corrugated paperboard according to claim 2, wherein said outer surfaces of said first and second liners both have a said coating thereon in which said metal ion is trivalent chromium; and said copolymer is a copolymer of butylacrylate and styrene; and said corrugated medium comprises a corrugated paperboard sheet having thereon a water vapor impermeable coating comprising polyvinylidene chloride, styrene-butadiene copolymer and an acrylic acid polymer.

4. A repulpable corrugated paperboard according to claim 1, wherein said coating is in a coating weight of 5 to 25 g/m².

5. A method of producing a repulpable coated paperboard for use in packaging manufacture comprising:
    a) providing a paperboard sheet having opposed first and second surfaces,
    b) coating at least one of said surfaces with a wax-free composition comprising:
        i) a styrene-acrylate copolymer,
        ii) a $C_{14}$-$C_{18}$ fatty acid complex of a metal ion having an oxidation state of at least 3, and
        iii) an aqueous vehicle, and
    c) drying said composition to form a repulpable, water-resistant, grease resistant, water vapor permeable coated paperboard.

6. A method according to claim 5, wherein said copolymer is a styrene-butylacrylate copolymer.

7. A method according to claim 5, wherein said copolymer is characterized in that in an aqueous dispersion in which the copolymer comprises 50%, by weight, said dispersion is anionic, has a viscosity at 23° C. of 300-650 mPas by ISO 3219, an apparent Brookfield viscosity at 23° C. of about 10,000 mPas and a pH of 7.5-9.0, said copolymer in said dispersion having an average particle size of about 0.1 µm.

8. A method according to claim 5, wherein said composition is dried to a coating weight of 5 to 25 g/m².

9. A method according to claim 5, wherein said aqueous vehicle comprises water and a lower alcohol.

10. A method according to claim 9, wherein said lower alcohol is isopropanol.

11. A method according to claim 10, wherein said complex is a water soluble Werner complex in which said metal ion is trivalent chromium and said fatty acid is tetradecanoic acid.

12. A method according to claim 11, wherein said complex is chromium pentahydroxy(tetradecanoato)di-.

13. A method according to claim 10, wherein said composition includes an inert particulate filler.

14. A method according to claim 13, wherein said composition comprises 35 to 99.5% of an aqueous dispersion of said copolymer, i) 0.5 to 5% of an alcoholic solution of said complex ii), up to 35% of said inert particulate filler and up to 25% added water, to a total of 100%; said aqueous vehicle iii) comprising water of said aqueous dispersion, said added water and alcohol of said alcoholic solution.

15. A method according to claim 5, wherein said complex is a water soluble Werner complex in which said metal ion is trivalent chromium, and said fatty acid is tetradecanoic acid.

16. A method according to claim 15, wherein said copolymer is a styrene-butylacrylate copolymer.

17. A method according to claim 5, wherein said composition includes an inert particulate filler.

18. A method according to claim 17, wherein said composition comprises 35 to 99.5% of an aqueous dispersion of said copolymer, i) 0.5 to 5% of an alcoholic solution of said complex ii), up to 35% of said inert particulate filler and up to 25% added water, to a total of 100%; said aqueous vehicle iii) comprising water of said aqueous dispersion, said added water and alcohol of said alcoholic solution.

19. A method according to claim 5, wherein said coated paperboard is liner board for corrugated paperboard packaging.

* * * * *